July 3, 1951   G. E. HAM   2,559,154
METHOD OF PREPARING COPOLYMERS OF ACRYLONITRILE
Filed Jan. 30, 1948
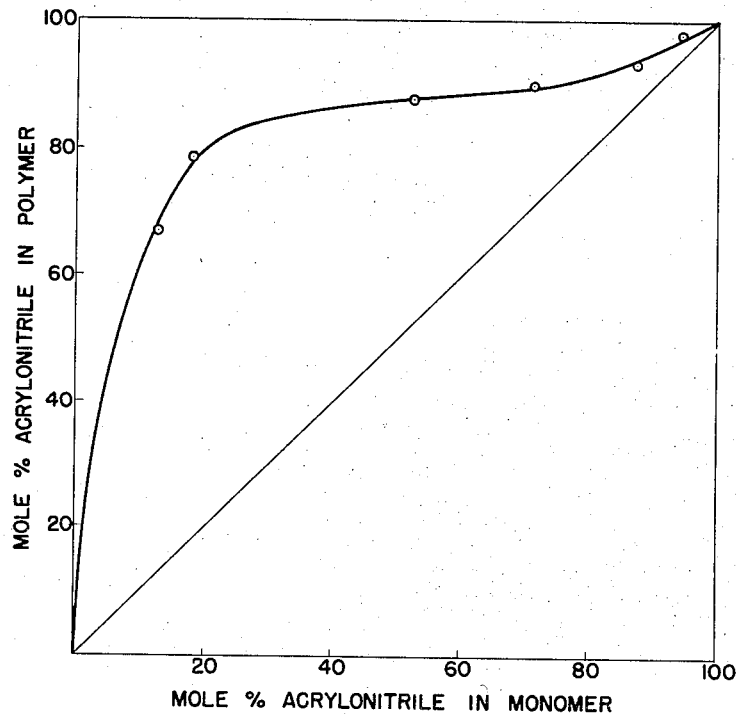
Fig.1-Comonomer Composition Curve
Vinyl Acetate—Acrylonitrile
*INVENTOR.*
DR. GEORGE E. HAM
*BY* DONALD J. HAEFELE
ATTORNEY Patented July 3, 1951

2,559,154

UNITED STATES PATENT OFFICE 2,559,154

METHOD OF PREPARING COPOLYMERS OF ACRYLONITRILE

George E. Ham, Dayton, Ohio, assignor to Monsanto Chemical Company, St. Louis, Mo., a corporation of Delaware Application January 30, 1948, Serial No. 5,482

12 Claims. (Cl. 260—80.5)

This invention relates to a new method of preparing copolymers of acrylonitrile and vinyl acetate, by use of which method very desirable copolymers are obtained. More specifically the method provides a means of preparing copolymers of uniform high molecular weight having unusual applicability in the fabrication of high tenacity fibers.

It is well known that polyacrylonitrile has very desirable fiber forming properties but is so insoluble that fibers are difficult to prepare by the conventional spinning methods, which involve the dissolution of the polymer in a suitable solvent and extrusion through an orifice into a medium which induces the precipitation of the solid polymer in a continuous filament. It is also known that copolymers of acrylonitrile and vinyl acetate are more soluble, and therefore more readily adaptable to fiber forming operations, but the spinning properties of these copolymers are not satisfactory because of the lack of uniformity in composition and molecular weight of the copolymers. Furthermore, polymerizations are not readily reproducible with respect to chemical and physical properties of the copolymers.

Accordingly, the primary purpose of this invention is to provide a practicable method of preparing a copolymer which is uniform in chemical composition and in molecular constitution. A further purpose of this invention is to provide an improved high tenacity fiber of uniform and readily reproducible physical characteristics.

The vinyl acetate and acryonitrile copolymer system is peculiar in that the monomeric proportions required to produce a desired copolymer must necessarily be much richer in vinyl acetate. In other words the acrylonitrile is more reactive and enters the copolymer more readily, and more rapidly unless very large proportions of the vinyl acetate are present in the reaction mass. When the usual batch polymerization methods are employed the first increment of copolymer is richer in acrylonitrile than the charged monomer mixture, and as polymerization proceeds the residual unreacted monomers become increasingly rich in vinyl acetate, the last increment of polymer being polyvinyl acetate, or at least very high in vinyl acetate. As a result the usual polymerization methods produce products widely varying in chemical composition and molecular weight.

It has also been found that the rate of reaction and the ratio of water to monomer influence the copolymer, particularly with respect to the molecular weight and particle size. Accordingly, it is desirable to maintain a uniform ratio of water to monomer. This condition has heretofore been quite difficult to maintain but the practice of polymerization in accordance with this invention appears to achieve the desired constant relationship. Although the exact mechanism of the reaction has not been conclusively established, the practice of the invention as is hereinafter described and claimed, results in the formation of copolymers which are much more uniform in chemical composition and physical structure than those produced by prior art methods.

In the practice of this invention the emulsion polymerization is maintained at a constant reflux temperature. The expression "constant reflux temperature" means a temperature which does not vary more than 1° C. from the initial temperature. This desired condition is accomplished by mixing the monomers under conditions of non-polymerization and introducing them to the reaction conditions at a rate which permits the maintenance of a constant reflux temperature. In order to achieve this result it will be necessary to adjust the flow of the monomers continuously or periodically throughout the reaction. If the reflux temperature increases the rate of addition should be increased; and if the reflux temperature drops, indicating that the proportion of unreacted monomer in the reaction mass has increased, the rate of addition should be reduced.

The polymerization is catalyzed by means of any water soluble peroxy compound, for example, sodium peroxide, hydrogen peroxide, sodium perborate, the sodium salts of other peroxy acids, the potassium, ammonium and other water soluble salts of peroxy acids, and any other water soluble compound containing a peroxy radical (—O—O—). A wide variation in the quantity of peroxy compound is possible. For example, from 0.01 to 1.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reaction throughout the reaction mass can be achieved by vigorous agitation, it is generally desirable to promote the uniform distribution of reagents by using wetting agents, or emulsion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amino soaps," such as triethanol amine and dodecyl methyl amine, salts of rosin acids and mixtures thereof, the water soluble salts of half esters of sulfuric acid and long chain alkyl alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.1 to 5 percent by weight of the monomers may be employed.

The temperature of polymerization is always the reflux temperature of the reaction mass. This may be almost as low as the boiling point of the more volatile component vinyl acetate and may be almost as high as the boiling point of water. In general temperatures from 70 to 95° C. may be employed, but preferred operations utilize temperatures between 72° C. and 82° C. Although the ratio of monomers being polymerized will have some effect on the reflux temperature, it appears that the ratio of water to monomer in the reaction mass, the nature and concentration of catalyst being used, and the quantity and type of emulsifier, also influence the ultimate reflux temperature of the reaction mass.

The reagents may be combined by a wide variety of methods. In general the monomers are mixed separately, and the mixture charged to a reaction vessel containing water and all of the other essential ingredients, and maintained at a temperature approximately the same as the ultimate reflux temperature. If desired the monomers may each be added in a separate stream, but it is more practicable to add a single stream of premixed monomers. In order to avoid unduly high concentrations of emulsifier in the reaction mass at the beginning of the reaction, most of it may be mixed with the monomer and added therewith to the reaction vessel. Preferably only a small portion of the catalyst is charged at the beginning of the reaction, and the remainder added either continuously or intermittently throughout the course of the reaction. The preferred manner of operation involves heating a body of water containing a small amount of catalyst and emulsifier to approximately the ultimate reflux temperature of the reaction, and thereafter charging the mixed monomers in the proportions desired in the ultimate copolymer.

The emulsion polymerizations are preferably conducted in glass or glass-lined vessels, which are provided with means for agitating the contents thereof. Generally rotary stirring devices are the most effective means for insuring the intimate contact of the reagents, but other methods may successfully be employed, for example by rocking or tumbling the reactors. The polymerization equipment generally used is conventional in the art and the fundamental consideration involved in the selection of the equipment is the type of reaction contemplated. Either apparatus, wherein a portion of the emulsion is removed continuously, or the semi-continuous apparatus, where all of the emulsion is retained in the reactor until the completion of the reaction, may be used. It is essential in the practice of this invention to charge the monomer gradually throughout the reaction, the rate of charging being determined by the reflux temperature of the reaction mass. Obviously a wide variety of automatic temperature controls may be used to assure the desired conditions. The ideal conditions are achieved by utilizing an automatic valve on the monomer supply which is regulated by a temperature control so as to provide at all times a reaction mass having a constant boiling point. These ideal conditions may be approximated by a mechanism which adds an increment of the monomer every time the temperature reaches a pre-determined maximum.

It will be apparent that in the practice of the invention, it is not possible to maintain a constant reflux temperature after all of the prepared charge of mixed monomers has been added. Accordingly, further polymerization may be avoided by interrupting the reaction. This may be done by destroying one or more of the essential conditions of polymerization, for example by reducing the temperature, by adding a polymerization inhibitor, by rapidly steam-distilling the mass to eliminate unreacted monomer, or by interrupting the reaction by precipitating the emulsion, by rapid stirring, freezing, addition of organic liquid, such as ethanol, or addition of inorganic salt.

Another expedient for more nearly attaining ideal operating conditions is to minimize the variation from the desired chemical composition encountered at the outset of polymerization. Any selected ratio of monomers will copolymerize to form a copolymer of definite proportions which are different from the monomer ratio. This relationship has been determined and is set forth on the accompanying drawing. In order to assure that every polymer increment has the identical chemical composition it may be desirable to charge the reactor with a proportion of monomers different from the ratio of components desired in the copolymer, but so selected that the first increment of polymer has the said desired ratio of components. As soon as the polymerization begins, the mixture of monomers in the proportion desired in the ultimate polymer is charged in accordance with the invention. Such procedure will produce an optimum product, but excellent approximations of the ideal conditions may be achieved by heating a body of water containing catalyst and emulsifying agent to approximately the ultimate temperature, and then charging the monomers of proportions desired in the ultimate copolymer at a rate such that a constant reflux temperature is maintained.

The method of this invention may be used to prepare a copolymer of very much more uniform properties than can be achieved by any method heretofore used. Although the method can be effectively used to prepare copolymers of 40 to 98 percent acrylonitrile and from two to 60 percent of vinyl acetate, it is primarily useful in preparing the high acrylonitrile copolymers, for example those in excess of 75 per cent of acrylonitrile. Copolymers of the latter type, are useful in the preparation of fibers by extruding solutions thereof through dies and precipitating the extruded polymer stream. In such fiber preparation methods it is desirable to use a copolymer capable of being dissolved but one which in fiber form is resistant to the action of solvents.

Such critical requirements necessitate the use of a copolymer extremely uniform with respect to chemical composition and molecular structure. Through the practice of this invention this can be achieved.

This invention may also be used to prepare copolymers of acrylonitrile and vinyl acetate which are also copolymers of a third monomer, methacrylonitrile. Copolymers of this type are described and claimed in the copending application, Serial No. 786,153, filed November 14, 1947, by Reid G. Fordyce and George E. Ham and now abandoned. The expression copolymers of acrylonitrile and vinyl acetate should be construed to include, in addition to the bipolymer of acrylonitrile and vinyl acetate, the terpolymer of acrylonitrile, vinyl acetate and a small proportion, for example up to 15 per cent of methacrylonitrile.

The method of this invention is useful in the acrylonitrile-vinyl acetate polymerization because of the peculiar nature of this monomer system. The details of the mechanism have not been ascertained, but it appears that the critical characteristics of this copolymerization system are widely divergent boiling points of the monomers, a difference in relative activity between the monomers, and the lower activity of the lower boiling monomer.

Further details of the practice of this invention and the beneficial results achieved are set forth with respect to the following specific examples.

*Example 1*

A 3-liter, 3-necked, round bottom flask was provided with a power driven stirring apparatus, a reflux condenser and a thermometer. The flask was charged with 1200 grams of distilled water, 4 grams of a sulfonated mahogany soap, and 2 grams of potassium persulfate. The flask was heated to a temperature of about 75° C. and then 400 grams of a mixture of 60 percent by weight vinyl acetate and 40 percent acrylonitrile were gradually added at a rate which permitted the maintenance of the reaction temperature between 73 and 74° C. After the reaction had been continued for eight hours an additional 2 grams of potassium persulfate were added to the reaction mass. The monomer was completely added in about sixteen hours and the reaction was immediately interrupted by passing steam directly into the reaction mass, whereby the unreacted monomers were removed by distillation. The resulting copolymer was dried and heated at 30 to 40° C. for eighteen hours. The copolymer was completely acetone soluble and was found to be a copolymer of 44.6 acrylonitrile. Compression molded specimens were found to possess tensile strength of 8,300 pounds per square inch and flexural strength of 15,600 pounds per square inch. A similar copolymer prepared over a temperature range of 72-84° C. was incompletely soluble in acetone and had a tensile strength of 7,700 pounds per square inch the flexural strength of 8,000 pounds per square inch.

*Example 2*

A 22-liter round bottom flask was provided with a power driven stirring apparatus, a reflux condenser, and a thermometer. The flask was charged with a mixture of 12,500 grams of distilled water, 12.5 grams of a sulfonated mahogany soap and 2.5 grams of potassium persulfate. A separately prepared 2500 gram mixture of 84 percent acrylonitrile, 11 percent methacrylonitrile, and 5 percent vinyl acetate, was added to the flask at a rate which permitted the maintenance of the temperature between 74 and 75° C. In two and a half hours the addition had been completed and the reaction mass was then steam distilled to remove unreacted monomers. The polymer was dried directly in a circulating air oven at 60 to 70° C.

*Example 3*

A 3-necked, 5-liter flask, provided with a stirring mechanism and reflux condenser was charged with 2000 grams of distilled water, one gram of sulfonated mahogany soap and one gram of potassium persulfate. A 500 gram mixture of 95 percent by weight acrylonitrile and 5 percent vinyl acetate was added at a rate which permitted a maintenance of the reaction temperature at 80° C. ±0.5° C. The reaction was completed in 1.75 hours and the unreacted monomers were removed by steam distillation at 100° C. The resulting copolymer was found to contain 94.2 percent acrylonitrile.

Although the invention has been described with respect to specific embodiments thereof, it is not intended that the details shall be construed as limitations on the invention except to the extent incorporated in the following claims.

I claim:

1. A method of preparing emulsion copolymers of more than 40 percent by weight acrylonitrile and at least two percent vinyl acetate which comprises adding the monomers in the proportions desired in the copolymer, to an aqueous medium containing a peroxy catalyst and an emulsifying agent at the reflux temperature, said addition being made at rates such that the reflux temperature remains constant.

2. In a method of preparing emulsion copolymers of at least 40 percent by weight of acrylonitrile and more than two percent of vinyl acetate, the step of adding the monomers in the proportions desired in the copolymer to an aqueous medium at a reflux temperature, said addition being made at rates such that the reflux temperature remains constant throughout the reaction period.

3. A method of preparing copolymers of at least 40 percent acrylonitrile and more than two percent of vinyl acetate which comprises adding the mixed monomer to an aqueous medium containing a peroxy compound and an emulsion stabilizer dissolved therein at the reflux temperature, said addition being made at rates such that a constant reflux temperature is maintained, and interrupting the reaction when the addition of the monomer to the aqueous medium is completed.

4. In an emulsion polymerization method for preparing copolymers of at least 40 percent by weight of acrylonitrile and more than two percent of vinyl acetate, the steps of adding a previously prepared mixture of monomers to the aqueous medium at rates such that a constant reflux temperature is maintained, and interrupting the reaction as soon as the addition of monomer to the aqueous medium is complete.

5. A method of preparing copolymers of at least 40 percent acrylonitrile and more than two percent of vinyl acetate which comprises mixing water, a peroxy catalyst, an emulsion stabilizing agent, said monomers in a ratio which upon polymerization will yield a copolymer of the desired ratio of monomers, subjecting said mixture to the reflux temperature to induce polymerization, adding additional monomers in the proportions desired in the ultimate copolymer at such rates that will enable the maintenance of a uniform reflux temperature.

6. In an emulsion polymerization method for preparing copolymers of at least 40 percent by weight of acrylonitrile and more than two percent vinyl acetate, the steps of initially charging monomers in a ratio which will upon polymerization yield a copolymer of the desired ratio of monomers, adding additional monomers in the ratio desired in the ultimate polymer throughout the polymerization at such rates that a constant reflux temperature is maintained.

7. A method of preparing copolymers of at least 40 percent acrylonitrile and more than two percent of vinyl acetate, which comprises mixing water, a peroxy catalyst, an emulsion stabilizing agent, and the said monomer in a ratio which will upon polymerization yield a copolymer of the desired ratio of monomers, polymerizing the monomers at the reflux temperature of the reaction mass while adding additional monomer in the ratio desired in the ultimate polymer at such rates that a constant reflux temperature is maintained, and interrupting the reaction as soon as the addition of monomer to the aqueous medium is completed.

8. In an emulsion polymerization method for preparing copolymers of at least 40 percent by weight of acrylonitrile and more than two percent of vinyl acetate, the steps of charging the reactor initially with monomers in the ratio which upon polymerization will yield copolymers of the desired ratio of monomers, conducting polymerization at the reflux temperature while adding additional monomer in the proportion desired in the ultimate copolymer at rates such that a constant reflux temperature is maintained, and interrupting the polymerization as soon as the addition of monomer is completed.

9. A method of preparing copolymers of 80 to 98 percent acrylonitrile and from two to 20 percent of vinyl acetate, which comprises continually adding monomers in the proportions desired in the ultimate copolymer to an aqueous medium containing a peroxy catalyst and an emulsifying agent at the reflux temperature, said addition being made at rates such that a constant reflux temperature is maintained.

10. In a method of preparing copolymers of from 80 to 98 percent of acrylonitrile and from two to 20 percent of vinyl acetate, the step of adding a previously prepared monomer mixture to the aqueous medium at reflux temperature, said addition being made at rates such that a constant reflux temperature is maintained.

11. A method of preparing copolymers of 75 to 97 percent acrylonitrile, from two to 18 percent methacrylonitrile and from two to ten percent of vinyl acetate, which comprises continuously adding a mixture of monomers in the desired ratio to an aqueous medium containing a peroxy catalyst and an emulsifying agent at the reflux temperature at atmospheric pressure, said addition being made at rates such that a constant reflux temperature between 70 and 95° C. is maintained.

12. In a method of preparing copolymers of 75 to 97 percent acrylonitrile, from two to 18 percent methacrylonitrile, and from one to ten percent of vinyl acetate, the step of adding a previously prepared monomer mixture to the aqueous medium at reflux temperature at atmospheric pressure, said addition being made at rates such that a constant reflux temperature between 70 and 95° C. is maintained throughout the reaction period.

GEORGE E. HAM.

REFERENCES CITED

The following references are of record in the file of this patent:

UNITED STATES PATENTS

| Number | Name | Date |
| --- | --- | --- |
| 2,420,330 | Shriver et al. | May 13, 1947 |
| 2,436,204 | D'Alelio | Feb. 17, 1948 |
| 2,486,241 | Arnold | Oct. 25, 1949 |

FOREIGN PATENTS

| Number | Country | Date |
| --- | --- | --- |
| 584,828 | Great Britain | Jan. 23, 1947 |